US005768550A

United States Patent [19]
Dean et al.

[11] Patent Number: 5,768,550
[45] Date of Patent: Jun. 16, 1998

[54] BUS INTERFACE LOGIC SYSTEM

[75] Inventors: Mark Edward Dean; Thoi Nguyen, both of Austin, Tex.

[73] Assignee: International Business Machines Corporation, Armonk, N.Y.

[21] Appl. No.: 560,758

[22] Filed: Nov. 21, 1995

[51] Int. Cl.$^6$ ...................................................... G06F 13/00
[52] U.S. Cl. .................. 395/309; 395/306; 395/200.62; 395/200.63
[58] Field of Search .................. 395/250, 200.08, 395/200.13, 200.19, 824, 872, 309, 200.62, 200.63, 306

[56] References Cited

U.S. PATENT DOCUMENTS

| | | |
|---|---|---|
| 4,660,170 | 4/1987 | Hui et al. . |
| 4,760,525 | 7/1988 | Webb . |
| 4,935,894 | 6/1990 | Ternes et al. . |
| 5,214,584 | 5/1993 | Dingee et al. . |
| 5,228,134 | 7/1993 | MacWilliams et al. . |
| 5,249,281 | 9/1993 | Fuccio et al. . |
| 5,250,940 | 10/1993 | Valentaten et al. . |
| 5,276,642 | 1/1994 | Lee . |
| 5,293,603 | 3/1994 | MacWilliams et al. . |
| 5,307,314 | 4/1994 | Lee . |
| 5,359,717 | 10/1994 | Bowles et al. ............................ 395/325 |
| 5,530,812 | 6/1996 | Kim et al. ................................ 395/309 |
| 5,561,820 | 10/1996 | Bland et al. ............................. 395/847 |
| 5,581,558 | 12/1996 | Horney, II et al. ..................... 370/401 |

OTHER PUBLICATIONS

IBM Technical Disclosure Bulletin, vol. 37 No. 05 May 1994, Separating the Interaction of Address and Data State During Bus Data Transfers, pp. 337–338.
IBM Technical Disclosure Bulletin, vol. 33, No. 3B Aug. 1990, Micro Channel/Multibus–II Interface, pp. 409–411.

*Primary Examiner*—Jack B. Harvey
*Assistant Examiner*—Jigar Pancholi
*Attorney, Agent, or Firm*—Volel Emile

[57] ABSTRACT

A system and method of synchronizing data transfers between two processors having different bus transactions by providing a buffer for storing the data and a control logic for dividing a concurrent address and data bus transactions into an address bus transaction followed by a data bus transaction. During a read operation, the requesting device is forced to wait for data availability before entering the data bus transaction. During a write operation, the data bus transaction is delayed by using a storage mechanism that effectively separates the address transaction from the data transaction. The present invention also provides direct memory access fly-by operations between an input/output device and a memory device. These operations are accomplished by isolating a secondary bus from the system bus and allowing the destination device to capture the requested data as soon as it is available on the system bus.

17 Claims, 6 Drawing Sheets

BUS INTERFACE LOGIC SYSTEM

BACKGROUND OF THE INVENTION

1. Field of the Invention

The present invention relates generally to data transfers between two devices having different bus cycles and data accesses. More particularly, the invention relates to a bus interface logic system accommodating such a data transfer.

2. Description of the Related Art

Ordinarily, a computing system is made of at least one processor which is connected to one or more processors and/or to one or more peripheral devices. Often times, however, the different processors and the peripheral devices have dissimilar data transfer bus tenures due to different design requirements, techniques or architectures. (A data transfer bus tenure is the length of time it takes for a device to receive or transmit data on a bus.) When this occurs, unless the different processors and peripheral devices are synchronized such that data is transmitted/received only when a particular device is ready to receive/transmit the data, data transfers will not occur.

One such problem occurs with the IBM Reduced Instruction-Set Computer (RISC) Power Series 60X processors and the RISC PowerPC 400 series processors.

The IBM Power Series 60X are general purpose processors whereas the PowerPC 400 series processors are application oriented processors or embedded controllers. That is, the PowerPC 400 series processors are used for controlled applications such as office automation, consumer electronics, set-top boxes, or where ever the power and compactness of electronics are needed to automate and simplify tasks. The PowerPC 400 series processors offer unique functions that include glueless interface to random-access-memories (RAMs) and read-only-memories (ROMs). They also provide such features as direct memory access (DMA) channels, serial ports, interrupt controllers etc.

Thus, it is desirable to use the PowerPC 400 series processors in conjunction with the Power Series 60X processors. Unfortunately, however, the PowerPC 400 series transfers and receives data by entering an address and a bus transaction concurrently and the Power Series 60X processors transfers and receives data by first entering the address bus transaction and then the data bus transaction. Hence, the two processors are unable to transfer data to and from each other.

Therefore, there is a need in the art to provide a bus interface logic system which synchronizes data transfers between the Power Series 60X processors and the PowerPC 400 series processors or any two or more processors and/or their peripheral devices having dissimilar data transfer bus tenures.

SUMMARY OF THE INVENTION

The need in the art is addressed by the present invention. The present invention provides a system and method of synchronizing data transfers between two processors by providing a buffer for storing transferring data and a control logic for dividing a concurrent address and data bus transactions into an address bus transaction followed by a data bus transaction. The control logic also directs the data flow to the buffer. During a read operation, the requesting device is forced to wait for the availability of the data before entering the data bus transaction. During a write operation, the data bus transaction is delayed by using a buffer mechanism to effectively separate the address bus transaction from the data bus transaction.

In addition, the present invention provides direct memory access (DMA) fly-by operations between an input/output device and a memory device. These operations are accomplished by isolating a secondary bus from the system bus and allowing the destination device to capture the data as soon as it is available on the system bus.

DESCRIPTION OF THE INVENTION

Figure 1:
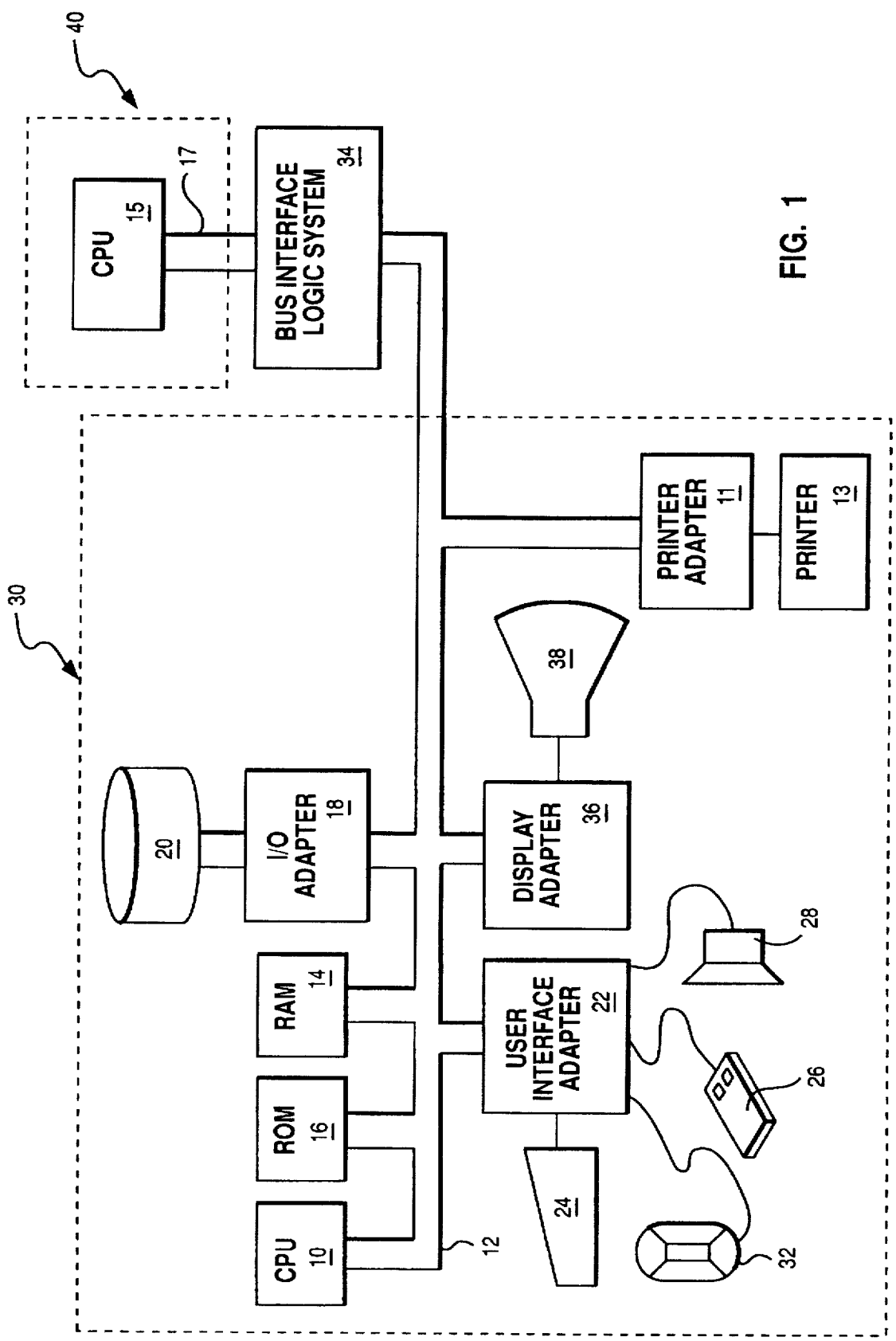
FIG. 1 is a typical data processing system incorporating the present invention.

Referring to FIG. 1, a typical data processing system, generally labeled 30, is shown which may be used in conjunction with the present invention. Data processing system 30 includes a central processing unit (CPU) 10, such as one of the RISC Power Series 60X processors, which is interconnected to various other components by system bus 12. Certain RISC Power Series 60X processors may require a host bridge (not shown) to interface with bus 12. Read only memory (ROM) 16 is connected to CPU 10 via bus 12 and comprises the basic input/output system (BIOS) that controls the basic computer functions. Input/Output (I/O) devices such as Keyboard 24, track ball 32, mouse 26 and speaker 28 are all interconnected to bus 12 via user interface adapter 22. Display monitor 38 is connected to system bus 12 through display adapter 36 and printer 13 is connected to bus 12 through printer adapter 11. In this manner, a user is capable of inputting to the system through keyboard 24, track ball 32 or mouse 26 and receiving output from the system via speaker 28, display 38 and printer 13. Random access memory (RAM) 14 and I/O adapter 18 are also interconnected to system bus 12. I/O adapter 18 may be a Small Computer System Interface (SCSI) adapter that communicates with a disk storage device 20.

Data processing system 30 is connected to data processing system 40 through bus interface logic system 34. Data processing system 40 includes a CPU 15 and a bus 17. The CPU 15 is connected to the bus 17 which is further connected to the bus interface logic system 34. CPU 15 may be one of the RISC PowerPC 400 series processors. Although data processing system 40 is shown as having a CPU and a bus, it should be understood that, as in the data processing system 30, it may contain any number of interconnected devices.

In the configuration shown in FIG. 1, CPUs 10 and 15 process and transfer data to and from each other, the memory devices 16 and 14 and the I/O devices 13, 20, 24, 26, 28 and 32. Data to and from data processing system 30 is acquired over the bus 12. Likewise, data to and from CPU 15 is acquired over the bus 17. However, due to the dissimilarity in bus tenures of the two systems, data on the bus 12 is not readily transferrable onto the bus 17 without the aid of the bus interface logic system 34. For example, CPU 10 transmits and receives data by first entering an address bus transaction and later a data bus transaction. During the address bus transaction, an address is sent to a particular device with which the CPU 10 wishes to communicate or to CPU 10 from a requesting device. During the data bus transaction, the data is received or transmitted by the CPU 10. CPU 15, on the other hand, transmits and receives data by entering both the address and the data bus transactions simultaneously. Accordingly, the bus interface logic system 34 is used to provide the proper transaction arbitration to allow data transfers between data processing systems 30 and 40. Note that, in this configuration, transaction requests are usually initiated by the CPU 15.

CPU 15 also has an on-chip DMA subsystem, that includes storage mechanism and channels, to provide DMA operations between an I/O device and a memory device. These DMA operations may be handled in two fashions: a bus mastering fashion and a fly-by fashion. During a DMA bus mastering operation, the DMA subsystem reads from the I/O device and then generates a write operation to memory. Or, the DMA subsystem reads from memory, buffers the data read in its storage mechanism, and generates a cycle to write the data to the I/O device.

The DMA fly-by operations, which are write-to-memory and read-from-memory operations, are accomplished as described below. During a DMA write-to-memory fly-by operation, the DMA subsystem generates a cycle to read data from the I/O device. While the data read is on the bus, the DMA subsystem informs the memory device that a write cycle has started and that it should pull the data from the bus. During a DMA read-from-memory fly-by operation, the DMA subsystem generates a memory read cycle in which the memory device puts the data on the bus. While the data is on the bus, the DMA subsystem generates an I/O write cycle to instruct the I/O device that it should appropriate the data from the bus. Note that during both DMA fly-by operations the data never enters the DMA subsystem's storage mechanism.

As shown in FIG. 1, both the I/O device and the memory device are in a Power Series 60X environment whereas the DMA subsystem, being part of the CPU 15, operates in a PowerPC 400 series environment. Therefore, as in the normal operations described above, the bus interface logic system 34 is used to provide the synchronization of the two systems.

Figure 2:
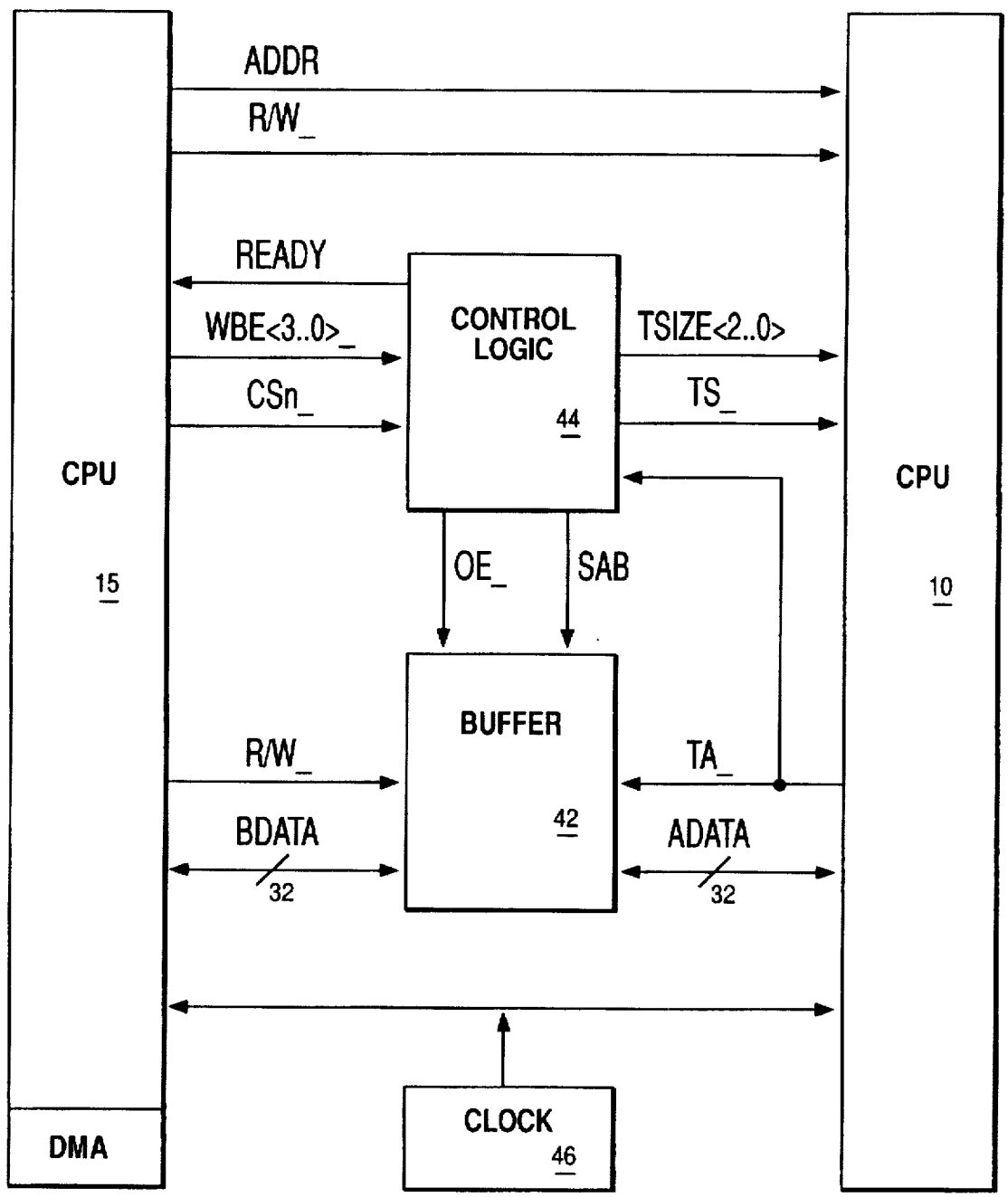
FIG. 2 is a detailed block diagram of the present invention.

FIG. 2 illustrates a detailed block diagram of the bus interface logic system 34. The bus interface logic system 34 includes a control logic 44 and a buffer 42. Control logic 44 provides the signals necessary to interface and synchronize the transfer of data between bus 12 and bus 17.

Buffer 42 provides bidirectional transfer of data. Buffer 42 comprises bus transceiver circuits and registers with 3-state outputs: a logical "zero", a logical "one" and a high impedance output. The high impedance output is used to isolate bus 12 from bus 17 when CPU 15 is operating in a DMA fly-by operation. The registers are made up of D-type flip flops. The buffer 42 has control circuitry arranged for multiplexing data directly from the input bus or from the internal registers. The buffer 42 also provides transparent latches on both the side of bus 12 and bus 17. (A transparent latch is a latch that passes output data when a control signal is in one state and holds the output data when the control signal is in the opposite state regardless of input data.) BDATA is data from data processing system 40 (i.e., data on bus 17) and ADATA is data from data processing system 30 (i.e., data on bus 12). Both ADATA and BDATA are 32-bit data. Clock 46 is used to provide the system clock signals.

When CPU 15 requests a read operation from CPU 10, it starts by sending a chip select (CSn) signal to control logic 44 to initiate the bus read tenure. Here, CSn is used to select the RAM/ROM or external I/O devices which are configured for bank register n inside the CPU 15, where n=0 to 7. CPU 15 also sends a read request over the R/W line as well as the address of the device from which data is to be read (in this case the address of CPU 10). The read request is also sent to buffer 42 to ensure that data is transferred from bus 12 to bus 17. In addition, CPU 15 sends a write byte enable (WBE<3 ... 0>) signal to the control logic 44. The WBE<3 ... 0> signal indicates the type of data transfer requested (i.e., one byte, one half-word or one word) by exhibiting the number of valid bytes in a four-byte data.

In turn, the control logic 44 provides a transfer start (TS) signal to CPU 10 while providing a ready signal (READY) "low" to CPU 15. The TS signal indicates to CPU 10 the beginning of a bus transaction while the READY "low" signal signifies that the data is not yet ready to be transmitted. The control logic 44 also sends a transfer size (TSIZE<2 ... 0>) signal to CPU 10. The TSIZE<2 ... 0> signal is a translation of the WBE<3 .. 0> signal sent by CPU 15 to the logic device 44.

When ADATA is available, CPU 10 places it on the bus 12 and asserts the transfer acknowledge (TA) signal provided to both buffer 42 and control logic 44. The TA signal is used by the buffer to latch the transmitted data from bus 12 to the internal latches of buffer 42. As soon as the TA signal is detected by control logic 44, the READY signal is driven to logical "one" indicating that the data will be ready at the next clock cycle. The control logic 44 also keeps the select A-to-B (SAB) signal at logical "one" to transfer the stored data onto bus 17.

Therefore, during a read operation, the bus interface logic system 34 effectively splits up the read bus transaction of CPU 15 into two bus transactions (i.e., an address bus transaction and a data bus transaction). The system enters the address bus transaction as soon as the address signal is sent to CPU 10. The data bus transaction is entered with the assertion of the READY signal. Thus, the CPU 15 is forced to wait until the data becomes available from CPU 10 before entering the data bus transaction. Consequently, the read tenure of CPU 15 is lengthened to compensate for the delay in the availability of the data from CPU 10.

In a write operation, CPU 15 starts by sending a CSn signal to control logic 44 to mark the beginning of the bus write transaction. The processor also sends an ADDR signal to CPU 10 and a write request to both CPU 10 and buffer 42. In this case, the write request to buffer 42 indicates the data is to be transferred from bus 17 to bus 12. The control logic 44 then provides a TS signal to CPU 10 to indicate the beginning of the bus transaction.

Upon requesting the write operation, the CPU 15 places the data onto bus 17. The control logic 44 drives the SAB and output enable (OE) signals to logical "zero" to allow for real time data transfer from bus 17 to bus 12. The control logic also drives the READY signal to logical "zero" to indicate that CPU 10 is not yet ready to receive the data. When ready, CPU 10 samples the data by asserting TA.

Thus, as in the read bus tenure, the write bus tenure is divided into an address and a data bus transaction. Here then, the address bus tenure occurs as soon as the address is sent to CPU 10. In this case, however, the FIFO buffer is used to delay the availability of the data from CPU 15 to CPU 10 to effectively separate the data bus transaction from the address bus transaction.

Figure 3:
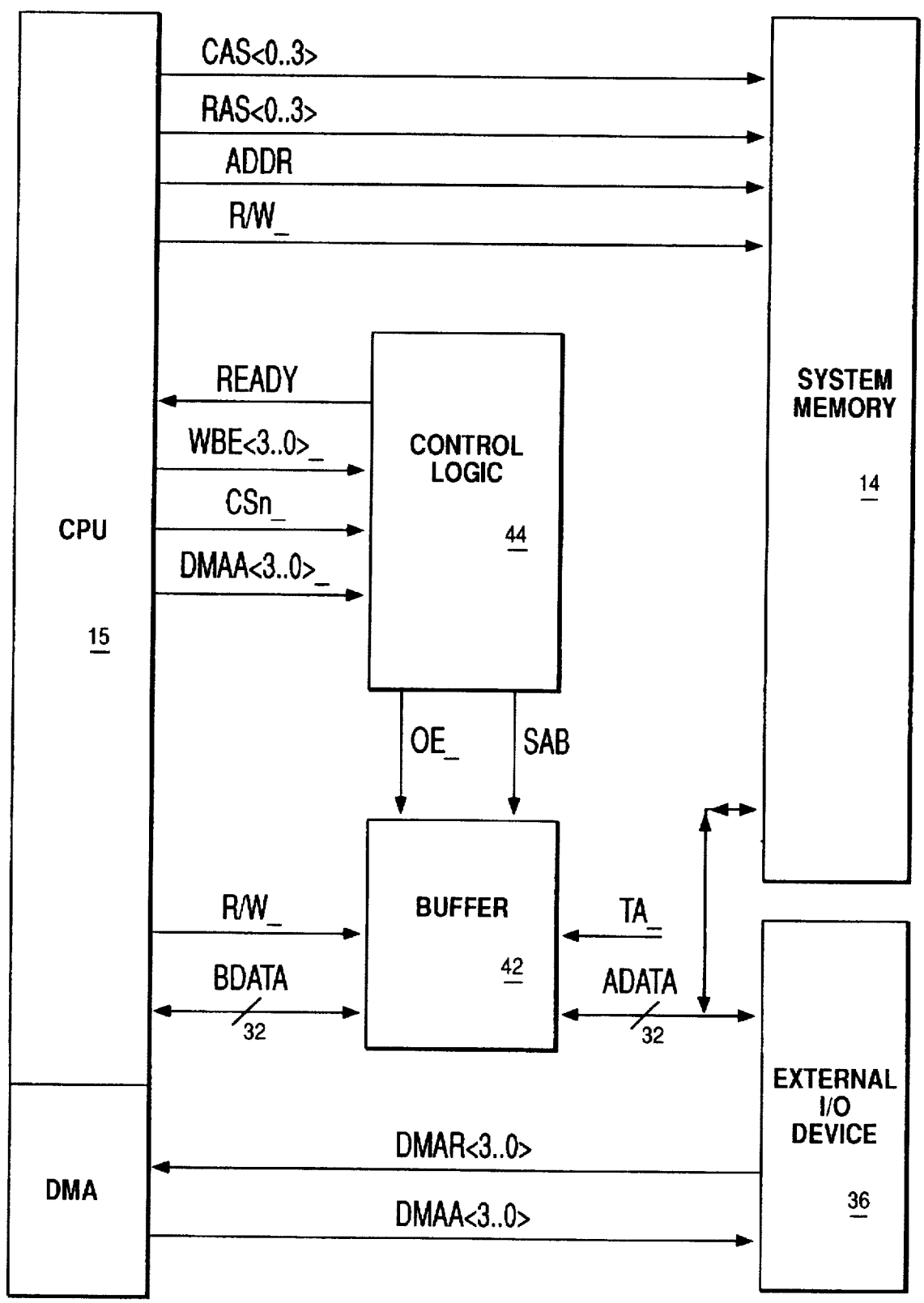
FIG. 3 is a detailed block diagram of the invention when performing a DMA fly-by operation.

As shown in FIG. 3, a number of different signals are involved in the DMA fly-by operations. For instance, when display adapter 36, on behalf of display monitor 38, requests a DMA fly-by read-from-memory operation from RAM 14, it starts by sending a direct memory access request (DMAR<3 . . . 0>) signal to CPU 15. Note that the channel over which the direct memory access is to occur is specified in the DMAR<3 . . . 0> signal. The CPU 15 honors the request by placing a valid row address (RAS<0 . . . 3>) and column address (CAS<0 . . . 3>) signals on the address bus. The CPU 15 also provides a DMA acknowledge (DMAA<3 . . . 0>) signal to control logic 44 and to display adapter 36. Upon receiving this signal, control logic 44 tri-states bus 17 by driving the OE signal to logical "one". This isolates bus 17 from bus 12 on which the DMA fly-by read transaction between RAM 14 and display adapter 36 is taking place. Once the requested data is available on bus 12, the display adapter 36 captures it from the bus and provides it to monitor 38. Note that in a DMA write-to-memory fly-by operation, the same sequence of signals occurs, except that the data is placed on the bus 12 by the display adapter 36 and is captured by the RAM 14 once available.

Figure 4:
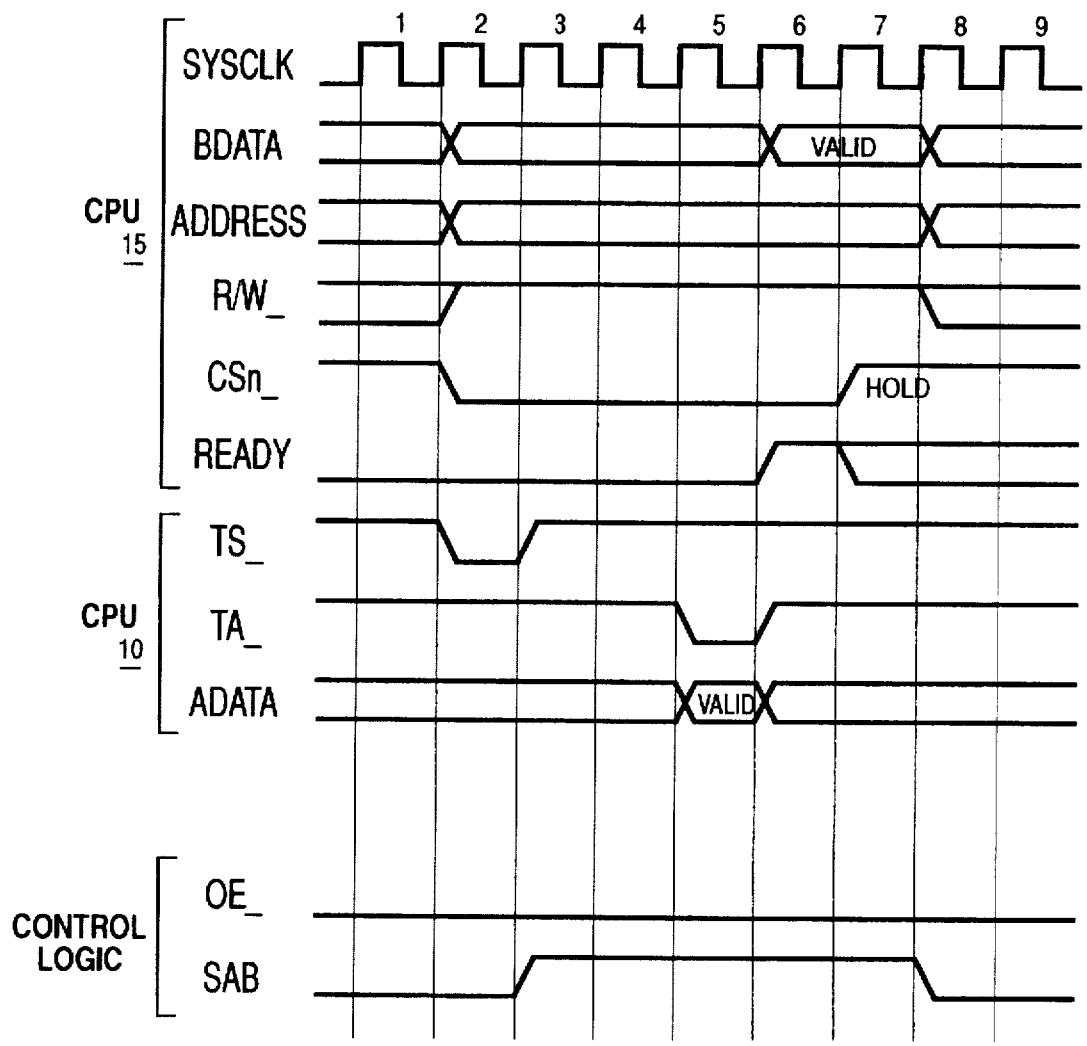
FIG. 4 depicts the various signals and their states in a read operation.

FIG. 4 depicts the various signals and their states when CPU 15 requests a read operation. Signal sysclk is the system clock signal and the intervals are clock cycles. At clock cycle 1, the read request has not been initiated and the system is in idle state (i.e., the state it was after performing its last operation). At the beginning of clock cycle 2, signal CSn is transitioned from a logical "one" to a logical "zero". The R/W and ADDR signals are transitioned appropriately. That is, if the last operation was a write operation, then signal R/W will be "low" during clock cycle 1. Hence, signal R/W will have to be driven to a logical "one" at the beginning of clock cycle 2 to indicate a read operation (in this case, a logical "one" or "high" signal signifies a read operation whereas a logical "zero" or "low" signal indicates a write operation). If, on the other hand, the last operation was a read operation, then the R/W signal will already be in a logical "one" state during clock cycle 1 and nothing further needs be done.

The ADDR signal will be driven to either a logical "one" or a logical "zero" depending on which device is being addressed. For simplicity purposes, the ADDR signal is shown as being one signal transitioning either to a logical "one" or a logical "zero", however, it should be noted that it may be a plurality of signals whereby each one goes either to a logical "one" or to a logical "zero" to form the particular address of the device selected. The TS signal is driven "low". Note that, although BDATA may be active, this data is not valid.

At the beginning of clock cycle 3, both the TS and SAB signals are driven to a logical "one". Clock cycle 4 is a wait cycle. That is, nothing happens during clock cycle 4 while the system awaits the availability of ADATA. Although the wait cycle is depicted as one clock cycle, it should be understood that depending on the readiness of the target device, it may be longer than one cycle.

During clock cycle 5, signal TA goes "low" indicating that ADATA is now available. ADATA then begins to be transmitted to buffer 42 at clock cycle 6, the READY signal goes "high" indicating to CPU 15 that the requested data is available. TA and ADATA return to their original states and valid BDATA begins to be transmitted. During clock cycle 7, CSn and READY go back to their original states whereas ADDR, R/W and SAB go back to their original states during clock cycle 8. Since CSn indicates the beginning and the end of the bus transaction, BDATA stops being valid when CSn transitions back to logical "one". At clock cycle 9, the system returns to its idle state.

Figure 5:
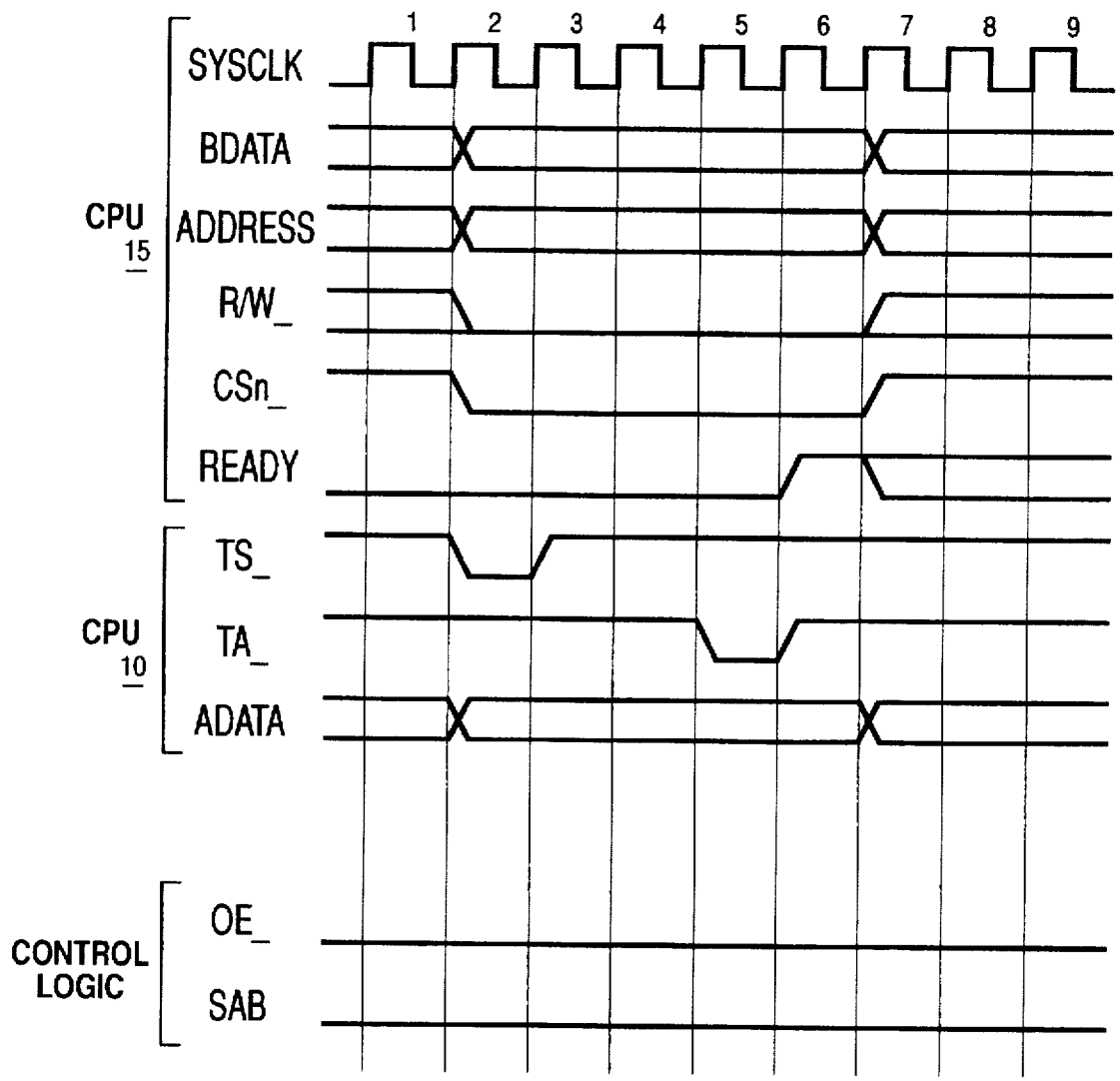
FIG. 5 depicts the various signals and their states in a write operation.

As shown in FIG. 5, the various signals undergo similar transitions during a write operation. For example, during clock cycle 2, ADDR will either be driven to a logical "one" or a logical "zero" depending on the address of the device selected. R/W will either go "low" or stay "low" depending on its previous state. CS and TS will go "low". Due to real time data transfer of a write operation, both ADATA and BDATA will be valid. At clock cycle 3, TS returns to its original state. Just as in the read cycle, clock cycle 4 is a wait cycle. During clock cycle 5, TA is transitioned to a logical "zero". Both TA and READY change their states during clock cycle 6 and at clock cycle 7, CS, READY, R/W and ADDR return to their original states. ADATA and BDATA stop being valid.

Figure 6:
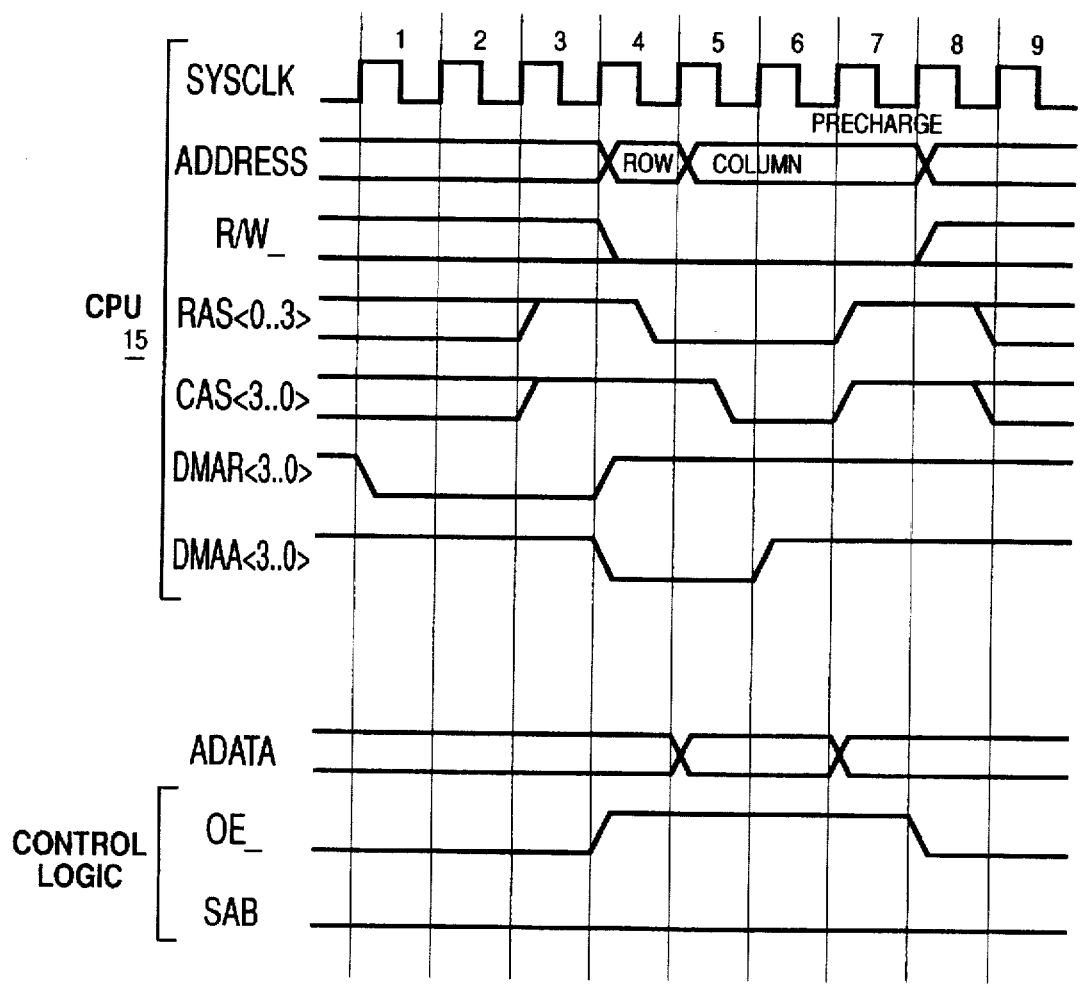
FIG. 6 depicts the various signals and their states in a DMA fly-by operation.

FIG. 6 depicts the various signals and their states in a DMA fly-by operation. At clock cycle 1, the DMA request is received (DMAR<3 . . . 0> goes "low"). During clock cycle 2, nothing happens. At clock cycle 3, the row and column addresses are selected by asserting RAS<0 . . . 3>and CAS<0 . . . 3>. A number of events occur during clock cycle 4. DMAA<3 . . . 0>transitions to logical "zero" to acknowledge the request. R/W will either stay at logical "zero" or transition to logical "one" depending on whether it is a read or a write request and DMAR<3 . . . 0>will be driven to logical "one". The row address will be put on the address line and OE will go "high" to isolate CPU 15. Then, the RAS<0 . . . 3> signal is transitioned to logical "zero".

During clock cycle 5, the column address is put on the address line, ADATA becomes valid and CAS<0 . . . 3> is driven to logical "zero". At clock cycle 6, DMAA<3 . . . 0>returns to logical "one" thus ending the acknowledgement. During clock cycle 7, both the RAS<0 . . . 3> and the CAS<0 . . . 3> signals return to logical "one" and ADATA stops being valid. At clock cycle 8, the R/W signal returns to its original state and the OE, RAS<0 . . . 3> and CAS<0 . . . 3> signals go back to being a logical "zero". The system returns to its idle state during clock cycle 9.

While the invention has been particularly shown and described with reference to the preferred embodiment thereof, it will be understood by those skilled in the art that changes in form and details may be made therein without departing from the spirit and scope of the invention.

What is claimed is:

1. A bus interface logic system for synchronizing data transfers between a first and a second device having different address/data bus tenures comprising:

storage means for storing data being transmitted from said first device to said second device, said data being stored to allow said second device time to be ready to receive said data; and a control logic means for forcing said first device to wait in a data bus tenure until said second device transmits said data.

2. The bus interface logic system of claim 1 wherein said control logic means generates a first control signal for transferring said data from a first bus to a second bus.

3. The bus interface logic system of claim 2 wherein said control logic means further includes input means for receiving a first signal initiating a bus request transaction.

4. The bus interface logic system of claim 3 having means for converting a four bit data size request to a three bit data size request.

5. The bus interface logic system of claim 4 wherein said control logic generates a second control signal allowing for direct memory access fly-by operations.

6. The bus interface logic system of claim 5 wherein said second control signal isolates said first bus from said second bus.

7. The bus interface logic system of claim 6 wherein said storage means includes bidirectional input/output means for receiving and transmitting said data.

8. An interface logic system for synchronizing data transfers between a first and a second network having different bus cycles comprising:

storage means for temporarily storing data being transferred between the first network and the second network, said storage means having Input/Output means for receiving and transmitting said data and input signal means for receiving control signals; and control logic means for providing synchronizing signals to transfer data from the first network to the second network and for providing the control signals to the storage means, said synchronizing signals including a first signal for forcing the first network to wait in a data bus tenure until the second network transmits said data, said first network transmitting data into said storage means to allow said second network time to become ready to receive said data.

9. The interface logic system of claim 8 wherein said control signals include a signal for isolating a first bus from a second bus and a second signal for directing data flow in said storage means.

10. The interface logic system of claim 9 wherein said control logic means translates a signal from the first network to a signal of the second network.

11. The interface logic system of claim 10 wherein said control logic means allows for direct memory access fly-by operations between an input/output device and a memory means attached to said second network.

12. A method of synchronizing data being transferred between a first and a second processor having different bus cycles comprising the step of:

dividing a concurrent address and data bus transactions into an address bus transaction followed by a data bus transaction, said step of dividing includes forcing said first processor to wait in a data bus tenure until said second processor transmits said data and storing data transmitted by said first processor into a storage means to allow said second processor time to become ready to receive said data.

13. The method of claim 12 wherein the step of dividing said concurrent address and data bus transactions includes the step of generating a first control signal for delaying said data bus transaction.

14. The method of claim 13 further including the step of generating a second control signal for transferring data from a first bus to a second bus.

15. The method of claim 14 further including the step of converting a four bit data size request to a three bit data size request.

16. The method of claim 15 further including the step of generating a third control signal allowing for direct memory access fly-by operations.

17. A computer system having at least a first processor with a first bus tenure and a second processor with a second bus tenure, said system comprising:

at least a first and a second bus, said first and said second processor connected to said first bus and said second bus, respectively;

a bus interface logic connected to said first bus and said second bus for facilitating transfer of data between said first processor and said second processor, said bus interface logic including:

storage means for storing data being transacted between said first and said second processor; and control logic means connected to said storage means and said first and said second bus for forcing said first processor to wait in a data bus tenure until said second processor transmits said data, said first processor transmitting data into said storage means to allow said second processor time to become ready to receive said data.

* * * * *

UNITED STATES PATENT AND TRADEMARK OFFICE
CERTIFICATE OF CORRECTION

PATENT NO : 5,768,550
DATED : June 16, 1998
INVENTOR(S) : Dean et al

It is certified that error appears in the above-identified patent and that said Letters Patent is hereby corrected as shown below:

Column 6, line 57: delete "transmits" and substitute therefor --receives--.
Column 7, line 23: delete "transmits" and substitute therefor --receives--.
Column 8, line 3: delete "transmits" and substitute therefor --receives--.
Column 8, line 37: delete "transmits" and substitute therefor --receives--.

Signed and Sealed this

First Day of August, 2000

*Attest:*

Q. TODD DICKINSON

*Attesting Officer*     *Director of Patents and Trademarks*